INVENTOR.
WERNER SCHAEFFER 3,442,405
TRANSPORTING ARRANGEMENT WITH TROUGH-SHAPED CONTAINERS OF FLEXIBLE MATERIAL
Werner Schaeffer, Hoffnungsthal, Bezirk, Cologne, Hoverweg 8, Germany
Filed Dec. 19, 1967, Ser. No. 691,910
Claims priority, application Germany, Dec. 20, 1966, Sch 39,989; July 26, 1967, Sch 41,060
Int. Cl. B65g 65/00, 67/22; B61b 13/06
U.S. Cl. 214—42                                           20 Claims

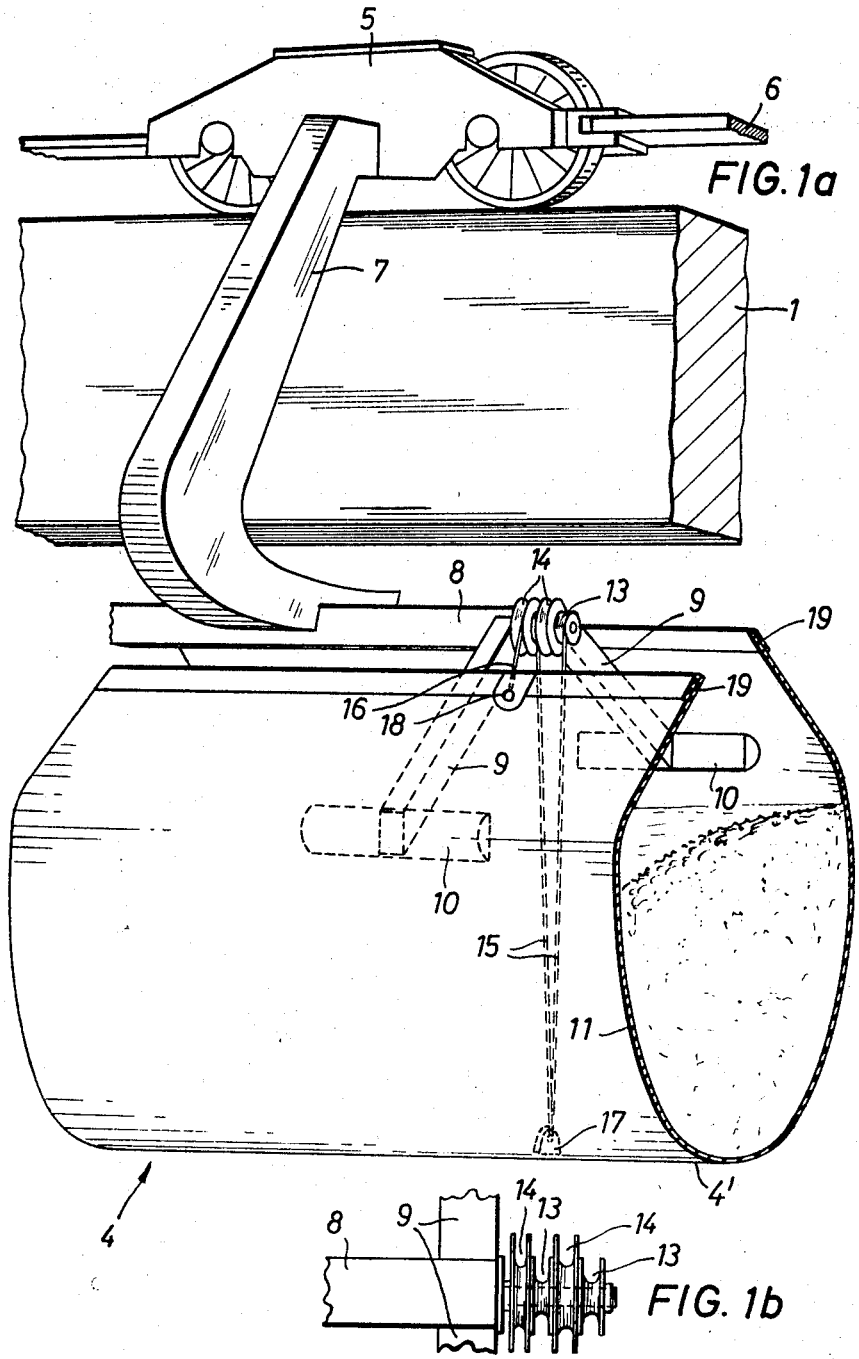

ABSTRACT OF THE DISCLOSURE

A transporting arrangement in which a substantially trough-shaped container of flexible material is suspended by means of ropes or the like on carriers which are movable along a predetermined path and in which the ropes are connected to bottom portions and upper edge portions of the container and guided over rollers carried by the carriers in such a manner that, when bottom portions of the container are engaged and raised by means located along a portion of the path, the edge portions of the container will move downwardly to an elevation below the raised bottom portions to thereby discharge material transported in the container from the latter.

Background of the invention

The present invention relates to a transporting arrangement in which elongated substantially trough-shaped containers of flexible material are moved in suspended condition along a predetermined path. Such transporting arrangements are known in the art in which for instance trough-shaped containers of flexible material are movable suspended on an elevated monorail and individually drawn or pushed by locomotive means connected thereto and likewise suspended on the monorail. The trough-shaped containers known in the art are provided along the bottom portion thereof with openable and closeable slide fasteners so that the loaded container may be discharged by opening the slide fastener. The slide fastener stringers may be opened and closed by a roller system carried by the train or by roller systems located along the aforementioned paths.

Such slide fastener closures for the flexible containers are quite often considered to be easily damagable or to become inoperative by foreign objects wedged between the coupling elements of the slide fastener, and this is one reason why transporting arrangements include trough-shaped containers of flexible material of the aforementioned kind have not found great acclaim in the art.

It is an object of the present invention to provide for a transporting arrangement with trough-shaped containers of flexible material movable in suspended condition along a predetermined path which are constructed in such a manner that they can be loaded and discharged without opening or closing bottom portions of the containers by slide fastener closure means.

It is an additional object of the present invention to provide a transporting arrangement with substantially trough-shaped containers of flexible material and with means for charging and discharging material into and from the container without opening the latter at the bottom.

It is a further object of the present invention to provide for a transporting arrangement of the aforementioned kind which is composed of relatively few and simple parts which can be manufactured at reasonable cost and which will stand up properly under extended use.

Summary of the invention

With these objects in view, the transporting arrangement according to the present invention mainly comprises elongated substantially trough-shaped container means of flexible material having a curved bottom portion and a pair of side walls integral with the bottom portion and having upper elongated edges, means supporting the trough-shaped container means in suspended condition movable along a predetermined path and including stationary guide means extending along the path above the container means, carrier means mounted on the guide means movable therealong, a plurality of roller means turnably carried by the carrier means, and elongated flexible means guided by the roller means and connected to the bottom portion and the elongated edges of the flexible trough-shaped container means to support the container means suspended on the carrier means while permitting the edges to move relative to each other and to the bottom portion of the container means during raising of the bottom portion so that, when the bottom portion is raised to a raised position adjacent to carrier means, the edges will move downwardly to an elevation below the raised bottom portion, and discharge means located at a portion of the aforementioned paths and arranged to engage and raise the bottom portion of the container means to the aforementioned raised position to thereby cause the edges of the container means to move downwardly to an elevation below the raised bottom portion and to thereby discharge material in the container means from the latter.

The transporting arrangement may also include drive means, preferably in the form of a locomotive, movable along the guide means and connected to the carrier means for pulling or pushing the latter and the container means suspended thereon along the predetermined path.

In a preferred form, each of the roller means comprises two pairs of rollers, wherein the rollers in each pair are connected together for rotation about a common axis, wherein one roller in each pair of connected rollers has a larger diameter than the other roller of the pair, and wherein the elongated flexible means for each pair of rollers comprises a pair of ropes, one rope being connected at one end to the large diameter roller and at the other end to a respective one of the edges of the container whereas the other rope is connected at one end thereof to the small diameter roller and at the other end to the bottom portion of the flexible container so that, during raising of the bottom portion, the edges of the container may move downwardly a distance greater than the distance the bottom portion is raised. Preferably, the rollers are provided with deep, relatively narrow grooves having a width substantially equal to the diameter of the respective rope so that when the rope is wound upon the roller, successive convolutions of the rope will be superimposed upon each other.

The carrier means may comprise an elongated central portion on which at least some of the roller means are mounted and a plurality of pairs of rigid spreader arms fixed at upper ends thereof to the central portion and extending from the fixed ends downwardly and outwardly inclined to engage with outer ends thereof portions of the flexible material forming the trough-shaped container to keep the latter in spread condition, and the ropes may have such a length so that the edges of the container may normally be closed adjacent to each other and the container by substantially closed at its upper end. A remaining gap may be closed by a stationary or movable cover. On the other hand, the lower outer ends of the spreader arms may be formed with grooves in which the edges of the container are normally engaged.

When the containers are constructed so that the upper edges thereof are in normal condition very close together, it is necessary in order to load the containers with material to provide in a loading station means for engaging and raising the bottom portion to such an extent to cause the edges to move away from each other to the region of the lower outer ends of the spreader arms to facilitate loading of the container. Such a loading station may include a substantially trough-shaped bed adapted to receive the trough-shaped container and wherein the engaging and raising means are formed by bottom wall portions of the trough-shaped bed which are movable between an inactive position downwardly spaced from the bottom portion of the container and a raised active position engaging the bottom portion and raising it to the aforementioned extent. The bottom wall portions of the bad may include a pair of plates hingedly connected at outer edges to the remainder of the bed and fluid operated jack means hingedly connected to the plates for moving the same between the aforementioned active and inactive positions thereof. On the other hand, the movable bottom wall portions of the bed may comprise inflatable means located at the bottom of the trough-shaped bed arranged in such a manner that the inflatable means, when inflated, will raise the bottom portion of the container to the aforementioned extent.

The discharge means may comprise lifting roller means arranged at a portion of the paths along which the container moves to engage the bottom portion of the container and to raise the bottom portion to its raised position. The lifting roller means may be turnably mounted on stationary support means so that successive bottom portions of the container are raised as the latter moves along the paths over the discharge means, or the lifting roller means may be mounted on support means which are movable along a portion of the paths so as to raise while the container is at standstill, successive bottom portions of the container during movement of the support means along the portion of the paths. On the other hand, the lifting roller means may be mounted on the support means movable between an inactive position downwardly spaced from the bottom portion of a container located above the discharge means and an active, raised postion engaging and raising the bottom portion of the container to the raised position.

The loading station may include an intermediate bunker adapted to discharge material into the container and this intermediate bunker has preferably a capacity substantially equal to that of the container.

On the other hand, the loading station may include discharge means for continuously discharging material into the container as the latter is moved by the locomotive means past the discharge means and in this case sensing means for sensing the extent to which successive portions of the container are filled by the discharge means are preferably provided and means cooperating with the sensing means for regulating the speed of the locomotive means while the latter moves the container past the discharge means in dependence on the amount of material fed into successive portions of the container.

The novel features which are considered as characteristic for the invention are set forth in particular in the appended claims. The invention itself, however, both as to its construction and its method of operation, together with additonal objects and advantages thereof, will be best understood from the following description of specific embodiments when read in connection with the accompanying drawing.

Brief description of the drawing

FIG. 1a is a partial perspective view, partly in section, and illustrating part of the container and the means for suspending the same;

FIG. 1b is a top view drawn to an enlarged scale of the roller means forming part of the means for suspending the flexible container of FIG. 1a;

Description of the preferred embodiments

Figure 1:
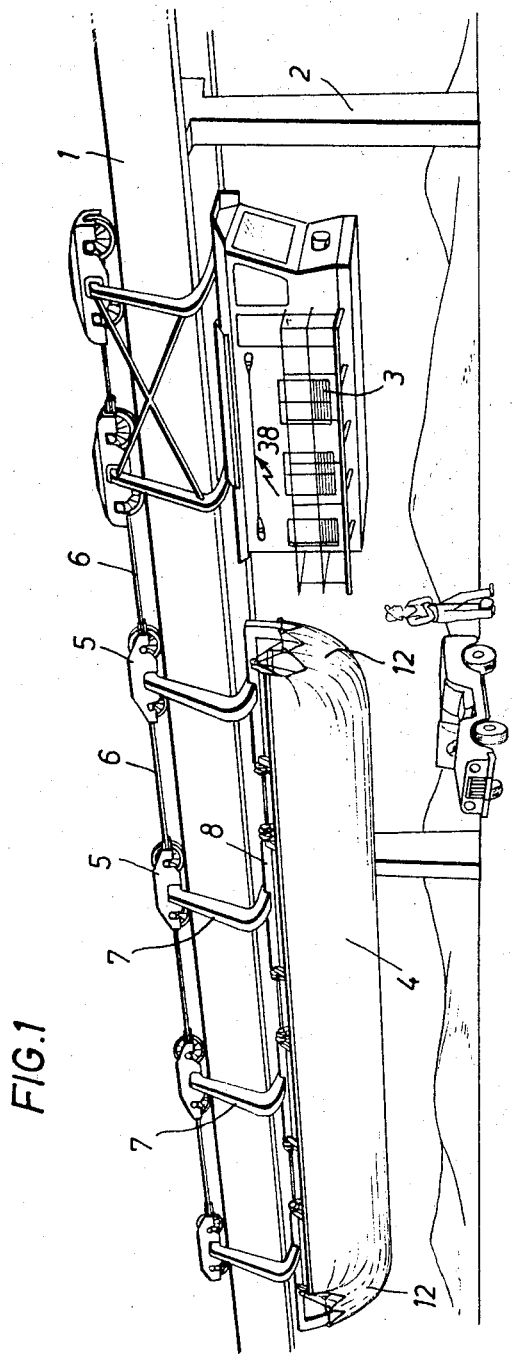
FIG. 1 is a schematic perspective view of a transporting arrangement according to the present invention.

FIG. 1 illustrates schematically an overall view of a portion of the transporting arrangement according to the present invention. As shown in FIG. 1, the transporting arrangement may include elongated stationary guide means which may comprise one or preferably two substantially parallel monorails 1 which are supported in a known manner on uprights 2 located between the two monorails. An overhead trolley locomotive 3 of known construction is movable along the monorail 1, and a plurality of connecting rods 6 connect a plurality of trolleys 5, on which a container 4 of flexible material is suspended by means including bows 7, to each other and to the trolleys of the locomotive 1. The trough-shaped container is closed at the front and rear end thereof by folded portions 12 of the material from which the flexible container is formed and which are connected to front and rear ends of a central carrier portion 8 to which the lower ends of the bows 7 are connected in such a manner that the container 4 is located beneath the respective monorail 1.

FIG. 1a illustrates at an enlarged scale further details of the means which support the trough-shaped container 4 in suspended condition movable along the monorail 1. As shown in FIG. 1a, the means supporting the trough-shaped container 4 in suspended condition include carrier means mounted on the rail 1 for movement therealong and the carrier means comprise the already mentioned trolleys 5 with the bows 7 connected thereto arranged in the manner as shown in FIG. 1a, which carry at the lower ends thereof a central bar 8 on which a plurality of pairs of roller means 13 and 14 are turnably mounted. The carrier means preferably comprise also a plurality of pairs of spreader arms 9, only one pair of which is shown in FIG. 1a, which are fixed at the upper ends to the bar 8 and which extend from the upper ends thereof downwardly and outwardly inclined and which carry, in the embodiment shown in FIG. 1a, fixed to the lower ends thereof, guide members 10 extending substantially parallel to the bar 8 and being of substantially semicircular cross section to engage with the outer curved surfaces thereof inner surfaces of the flexible material 11 which forms the trough-shaped container to keep the side walls of the container in spread condition. The flexible container is actually suspended on the aforementioned carrier means by elongated flexible means, which are preferably formed from nylon covered ropes, and which are attached to the, preferably reinforced, upper edges 19 of the flexible material 11 forming the container 4 and to the bottom portion 4' of the container as will now be described. Each of the roller means, in the embodiment illustrated in FIG. 1a, comprises two pairs of rollers 13 and 14 turnably arranged on a common axis and each pair of rollers 13 and 14 are fixed together for simultaneous rotation about the common axis. As clearly shown in FIG. 1b, the roller 14 of each pair has a diameter greater than the roller 13. The ropes by means of which the flexible trough-shaped container 4 is suspended on the carrier means comprise, for each pair of rollers, a rope 16 connected at one end thereof, in any suitable way not shown in the drawing, to a peripheral portion of the large diameter roller 14 and at the other end connected by means of a suitable fixture 18 to one of the reinforced upper edges 19 of the container. Another rope 15 is connected at one end thereof to the small diameter roller 13 and at the other end thereof to a suitable fixture 17 fixed to the bottom portion 4' of the container. The other pair of roller means is likewise connected by ropes 15 and 16 to the fixture 17 and to a fixture 16 connected to the other edge of the container. The rollers 13 and 14 are provided, as best shown in FIG. 1b with deep grooves having a width substantially equal to the diameter of the respective rope wound thereon and unwound therefrom so that successive turns of the wound rope will be arranged superimposed upon each other. The rollers 13 and 14 of each pair of connected rollers are provided with different diameters so that during raising of the bottom portion of the flexible container, in the manner as will be described later on in detail, the edges 19 of the trough-shaped container may move downwardly over a greater distance than the bottom portion is raised.

Figure 2:
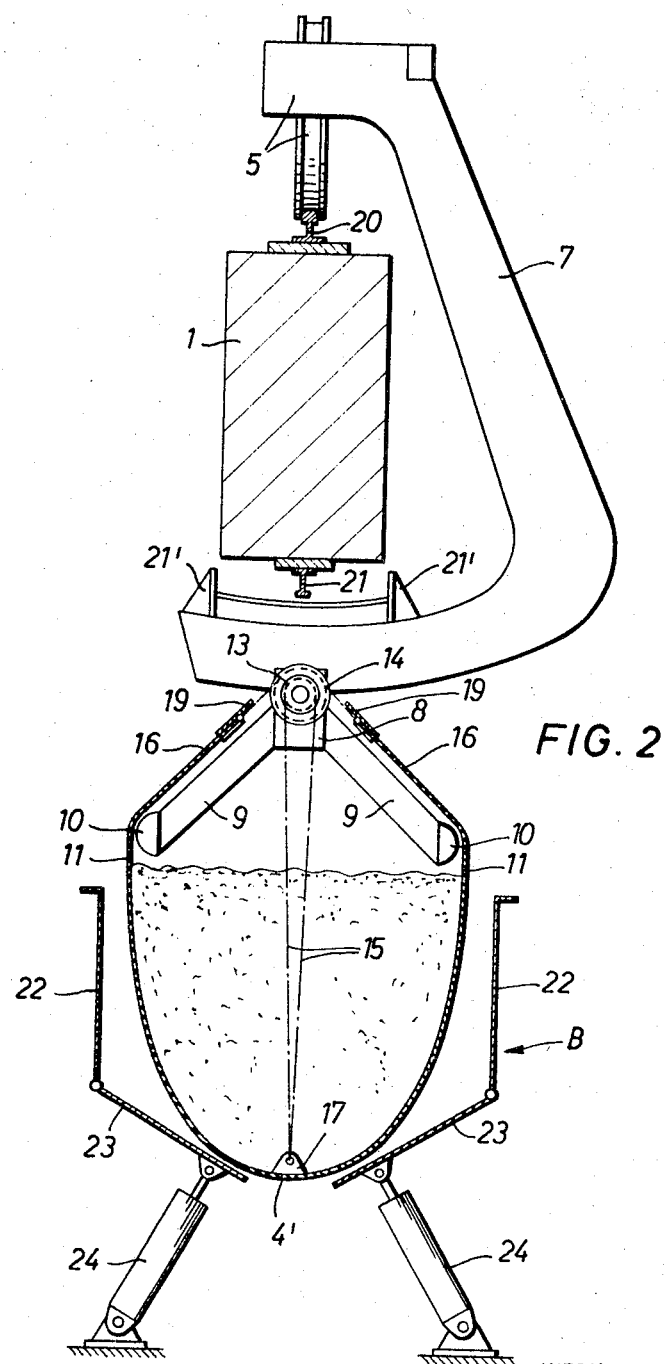
FIG. 2 is a transverse cross section through the arrangement shown in FIG. 1a and showing the container at a loading station.
Figure 3:
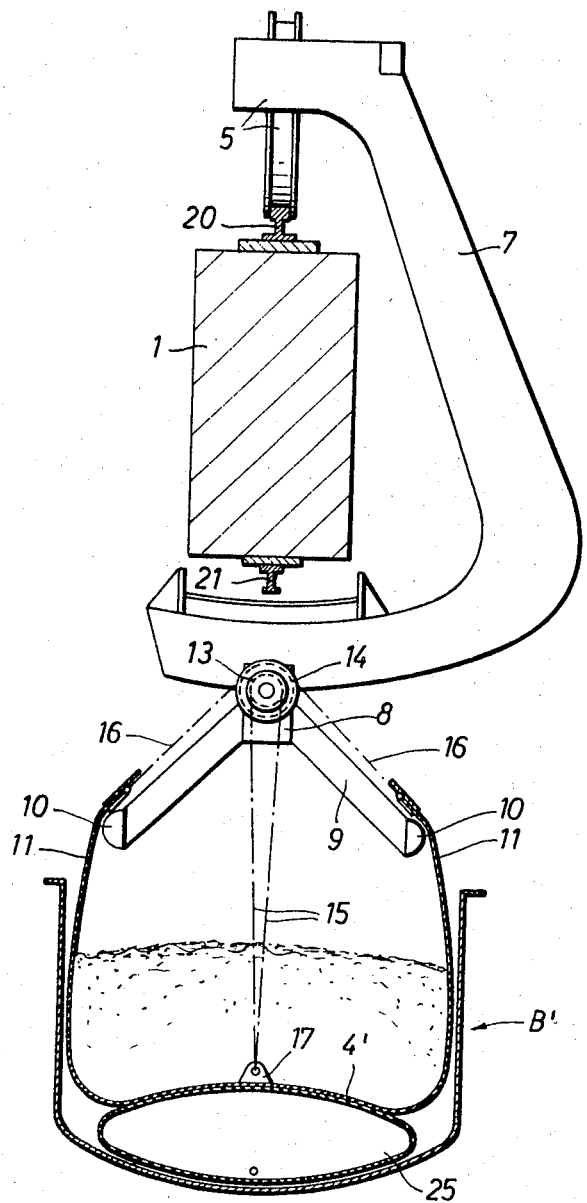
FIG. 3 is a transverse cross section similar to FIG. 2 and showing a loading station of different construction.

In the embodiment shown in FIGS. 1a, 2 and 3, the lengths of the ropes 15 and 16 are such that normally the edges 19 of the trough-shaped container are very close together so as to form a very narrow gap therebetween which may be covered by cover means, not shown in the drawing, which may be carried by the central bar 8. Under these conditions, loading of the container 4 with material would be practically impossible and in order to load the container with material, it will be necessary that the upper edges 19 of the trough-shaped container are moved away from each other far enough to provide a wide gap therebetween suitable for loading the container with material. For this purpose at least one loading station is provided located at a portion of the path along which the container may move and arranged to cooperate with the embodiment shown in FIG. 1a for moving the edges 19 away from each other. The loading station may comprise means located beneath the bottom portion 4' of the container for engaging and raising the bottom portion to such an extent to cause the edges 19 to move away from each other to the region of the lower outer ends of the spreader arms 9 to thus facilitate loading of the container. Two embodiments of loading stations of the aforementioned kind are respectively shown in FIGS. 2 and 3.

As shown in FIG. 2, the loading station comprises a substantially trough-shaped bed B adapted to receive the container 4 between the side walls 22 thereof. The trough-shaped bed B has a pair of bottom wall portions 23 hinged along the outer edges thereof to the bottom edges of the side walls 22 so as to be movable between an inactive position shown in FIG. 2, in which the plates 23 are slightly downwardly spaced from the bottom portion 4' of the container, and an upwardly raised position in which the plates 23 engage with their inner end portions the bottom portion 4' of the container to raise the bottom portion 4' of the container to such an extent so that the edges 19 of the flexible container will move downwardly until they engage the guide members 10 to form thus a wide gap between themselves, permitting loading the container. The plates 23 are moved between the inactive and the active position thereof by preferably fluid operated jacks 24 hingedly connected to the plates 23 and to fixed supports in the manner as clearly shown in FIG. 2.

As also shown in FIG. 2, the monorail 1 may comprise an elongated heavy portion of substantially rectangular cross section, formed from reinforced concrete or a similar material, which carries at the upper surface thereof a metal rail 20 on which the wheels of the trolleys 5 ride, and which carries at a bottom face thereof an additional rail 21 cooperating with projections 21' on the bottom portion of each bow 7 to limit any swinging motion of the bow and the trolley 5 connected thereto about the longitudinal axis of the rail 20.

FIG. 3 illustrates a second embodiment of a loading station according to the present invention which includes a trough B' adapted to receive the trough-shaped container between the side walls thereof and which is provided at its bottom with inflatable means 25, which, when inflated as shown in FIG. 3, engage the bottom portion 4, of the container to lift the bottom portion to such an extent so as to cause the upper edge portions of the container to move downwardly to the region of guide members 10 as shown in FIG. 3.

Figure 4:
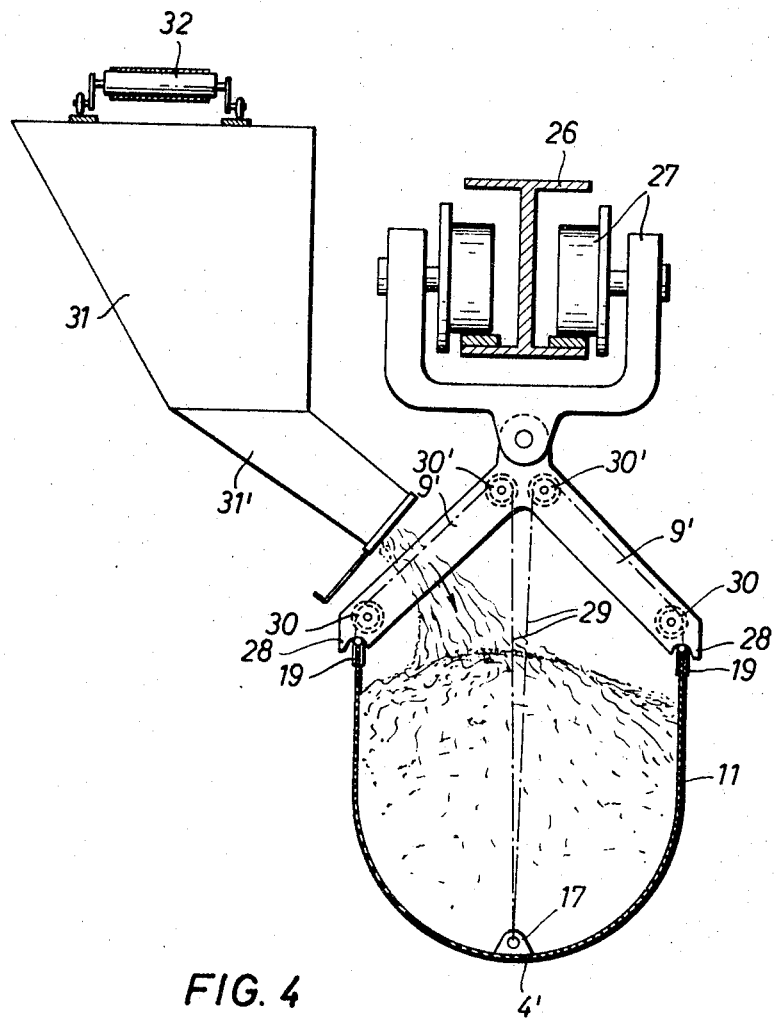
FIG. 4 is a transverse cross section similar to FIG. 2 and showing another embodiment of container according to the present invention and means for suspending the same, as well as an intermediate bunker for loading the container.
Figure 5:
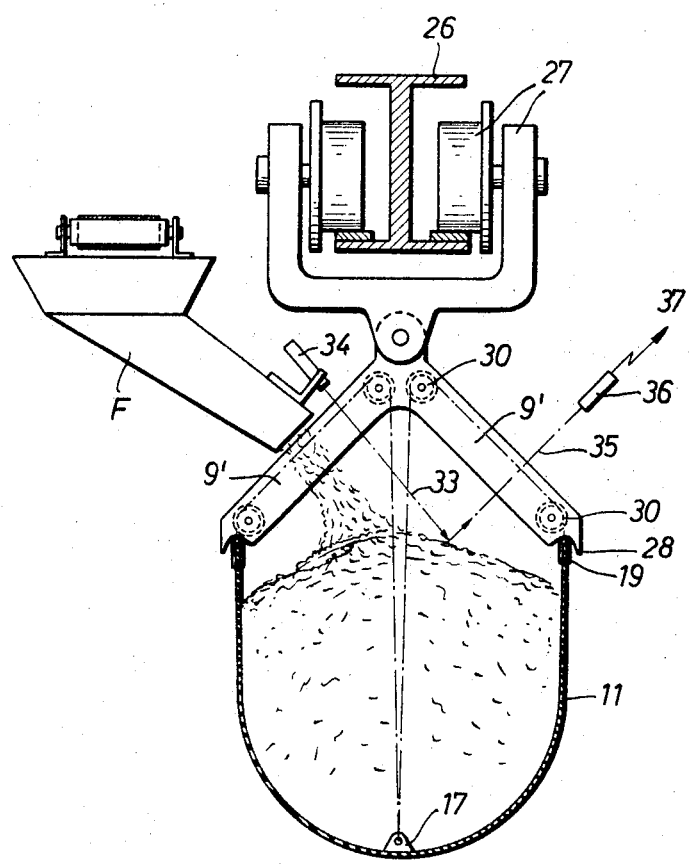
FIG. 5 is a cross section similar to FIG. 4 and showing different means for loading the container.

FIGS. 4 and 5 disclose a different embodiment of a trough-shaped container according to the present invention and means for suspending the container movable along a monorail. As shown in FIGS. 4 and 5, the monorail may include an I-beam 26, on the lower flanges of which move trolley means 27 of known construction, as schematically illustrated in FIGS. 4 and 5. The carrier means of the embodiment illustrated in FIGS. 4 and 5 may include in addition to the trolley means 27 a plurality of pairs of spreader arms 9', of which only one pair is shown in FIGS. 4 and 5, and in which each pair of spreader arms 9' is pivotally connected at the upper end thereof to a central portion of the trolley means 27, as schematically indicated in FIGS. 4 and 5. The spreader arms 9' of each pair extend from the connected upper ends thereof outwardly and downwardly inclined to opposite sides of the central portion of the trolley means 27. Each of the spreader arms 9' is provided at the outer lower end thereof with a groove 28 in which the upper reinforced edge portions 19 of the trough-shaped container means are normally engaged, as shown in FIGS. 4 and 5. In the embodiment shown in these two figures, the upper edge portions 19 are thus normally held spaced from each other to provide a wide gap therebetween, permitting loading of material into the interior of the trough-shaped container. In this embodiment it is not necessary to provide the rollers over which the ropes connected to the edge portions and to the bottom portion of the container are guided with different diameters and in this construction a single rope 29 is provided which is connected at opposite ends thereof in any convenient manner to the opposite edge portions 29 and which is guided over rollers 30 turnably mounted in the region of the lower outer ends of the spreader arms 9' and over a pair of further rollers 30' turnably mounted in the region of the upper ends of the spreader arms 9; from which the rope portions 29 lead downwardly to a fixture 17 connected to the bottom portion 4' of the flexible sheet material 11 which forms the walls of the container.

FIG. 4 illustrates also schematically a loading station for loading the container while the latter is at standstill. The loading station illustrated in FIG. 4 includes an intermediate bunker 31 having a discharge end 31', which is openable and closeable by an appropriate slide and the intermediate bunker 31 extends over the whole length of the container 4 and has a filling capacity equal to that of the container so that the latter may be loaded quickly while being at standstill from the intermediate bunker 31. The intermediate bunker 31 is filled during the time between successive trains over a transporting conveyor 32 from a main bunker, not shown in the drawing.

FIG. 5 illustrates another arrangement for loading a container with material while the latter moves slowly past the loading station. In this arrangement a funnel F is provided through which a stream of material to be loaded in the container is guided to a fall in a central portion of the container. The cross section of the stream, that is the amount of material delivered by time unit may be regulated in any known manner. The arrangement preferably includes also means for regulating the speed of the locomotive which pulls the container past the filling station or the funnel F in dependence on the amount of material fed into successive portions of the container. The aforementioned means for regulating the speed of the locomotive may include sensing means for sensing the extent to which successive portions of the container are filled by the discharge means or the funnel and the sensing means may include means 34 for producing ultrasonic waves 33 which are reflected by the upper surface of the material filled into the container as waves 35 received in a receiver 36 of known construction and adapted to produce signals depending on the length of the paths of the waves 33 and 35 and to transmit the signals in form of radio waves 37 to an antenna 38 carried by the locomotive, which in turn is provided with known means to translate the signals received so as to regulate the speed of the locomotive in dependence on the level of material in the container sensed by the sensing means 34, 36.

Figure 6:
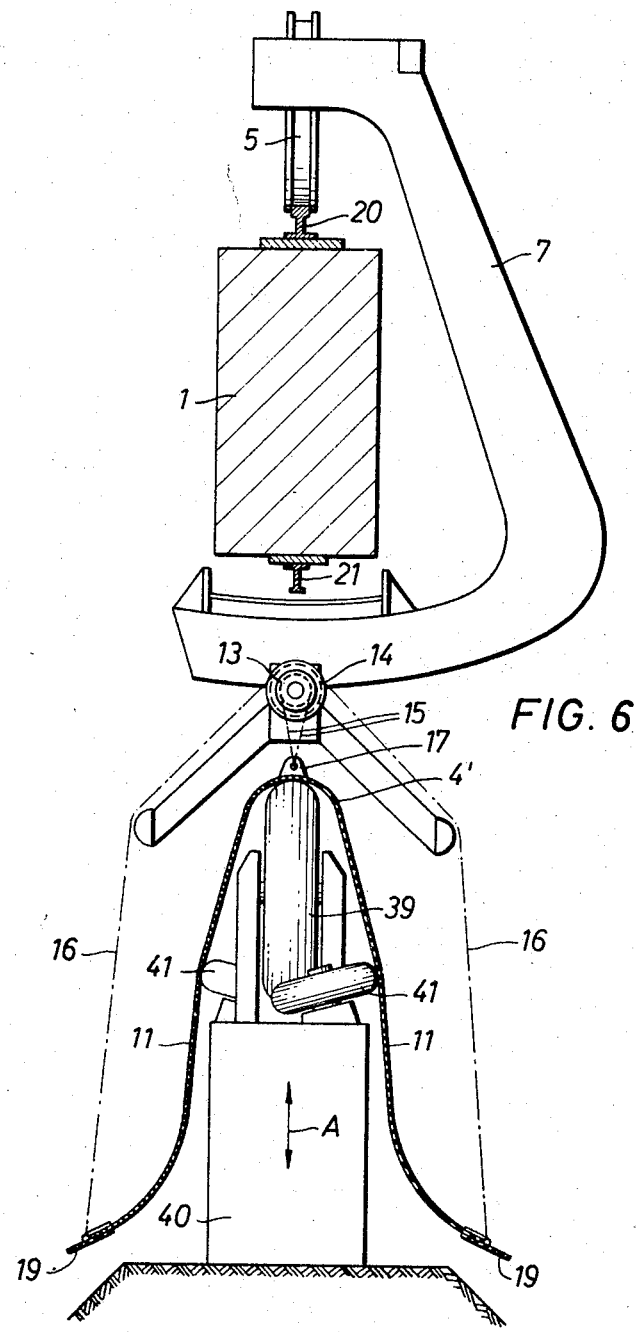
FIG. 6 is a cross section similar to FIG. 2 and illustrating also discharge means engaging the bottom portion of the container to raise the latter to a discharge position while the edges of the container are simultaneously lowered.

FIG. 6 schematically illustrates discharge means arranged to engage and raise the bottom portion 4' of the container to thereby cause the edges 19 of the container to move downwardly to an elevation below the raised bottom portion and to thereby discharge material in the container from the latter. The discharge means may comprise at least one, or a plurality, of rollers or pneumatic tires 39 which are turnably mounted on support means 40 and arranged to engage the bottom portion 4' of the container to raise the bottom portion to a raised position adjacent the central portion of the carrier means so that the edge portions 19 which are connected by means of the rollers 13 and 14 and the ropes 15 and 16 to the fixture 17 are simultaneously lowered to an elevation far below the raised bottom portion 4', as shown in FIG. 6, so that material in the container will be discharged to opposite sides of the raised bottom portion. The raising means may also include a plurality of inclined rollers or pneumatic tires 41 adapted to engage the side walls of the container when the edge portions thereof are lowered as shown in FIG. 6.

The support 40 which turnably supports the lifting roller 39 may be stationary mounted so that the lifting roller will first engage the curved leading front edge of the container and subsequently the bottom portion thereof as the container moves along the monorail, or the support means 40 may be mounted movable in the direction of the monorail and to be moved along the container while the latter is at standstill.

It is also possible to mount the support means 40 movable in vertical direction, as indicated by the arrows A, between a raised position as shown in FIG. 6 and an inactive downwardly displaced position in which the bottom portion of the container will move downwardly under its own weight to its normal position as shown for instance in FIG. 1a, while the edges 19 of the container move simultaneously upwardly and in which the lifting roller 39 is spaced downwardly from the bottom portion 4' of the container. In the latter arrangement the raising means preferably includes a plurality of rollers 39 mounted on the support means 40 spaced in direction of the elongation of the container from each other.

It is to be understood that lifting roller means as described above may also cooperate with the bottom portion of the container shown in FIGS. 4 and 5 to raise the bottom portion and to cause thereby the edges of the container to move downwardly.

It will be understood that each of the elements described above, or two or more together, may also find a useful application in other types of transporting arrangement differing from the types described above.

While the invention has been illustrated and described as embodied in a transporting arrangement with an elongated substantially trough-shaped container of flexible material movable in suspended condition on a monorail, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A transporting arrangement, comprising, in combination, elongated substantially trough-shaped container means of flexible material having a curved bottom portion and a pair of side walls integral with the bottom portion and having upper elongated edges; means supporting the trough-shaped container means in suspended condition movable along a predetermined path and including stationary guide means extending along said path above the container means, carrier means mounted on said guide means movable therealong, a plurality of roller means turnably carried by said carrier means, and elongated flexible means guided by said roller means and connected to the bottom portion and said elongated edges of said flexible trough-shaped container means to support the latter suspended on said carrier means while permitting said edges to move relative to each other and to the bottom portion during raising of the latter so that, when said bottom portion is raised to a raised position adjacent to said carrier means, said edges will move downwardly to an elevation below said raised bottom portion; and discharge means located at a portion of said path and arranged to engage and raise said bottom portion to said raised position to thereby cause said edges of the container means to move downwardly to said elevation below said raised bottom portion and to thereby discharge material in said container means from the latter.

2. A transporting arrangement as defined in claim 1, and including drive means cooperating with said carrier means for moving the latter along said predetermined paths.

3. A transporting arrangement as defined in claim 2, wherein said drive means comprise locomotive means movable along said guide means and connected to said carrier means for moving the latter and said container means suspended thereon along said predetermined path.

4. A transporting arrangement as defined in claim 1, wherein each of said roller means comprises two pairs of rollers, wherein the rollers in each pair are connected together for rotation about a common axis, wherein one roller in each pair of connected rollers has a larger diameter than the other roller of said pair, and wherein said elongated flexible means for each pair of rollers comprises a pair of ropes, one rope being connected at one end to the large diameter roller and at the other end to a respective one of said edges and the other rope being connected at one end to said small diameter roller and at the other end to said bottom portion of said flexible container means so that, during raising of said bottom portion, said edges may move downwardly a distance greater than the distance the bottom portion is raised.

5. A transporting arrangement as defined in claim 1, wherein said carrier means comprises an elongated central portion on which at least some of the roller means are mounted, and a plurality of pairs of rigid spreader arms fixed at the upper ends thereof to said central portion and extending from said fixed ends downwardly and outwardly inclined to engage with outer ends thereof portions of the flexible material forming the trough-shaped container means to keep the latter in spread condition, and wherein said elongated flexible means have a length so that said edges of said container means will normally be closely adjacent to each other.

6. A transporting arrangement as defined in claim 5, wherein said spreader arms carry at outer ends thereof guide members extending in longitudinal direction of said elongated container means over which said flexible material and said elongated flexible means are guided during the movement thereof.

7. A transporting arrangement as defined in claim 5, wherein said edges of said flexible material are reinforced.

8. A transporting arrangement as defined in claim 1, wherein said carrier means comprises a central portion on which some of the roller means are mounted and a plurality of pairs of rigid spreader arms connected at upper ends thereof to said central portion and extending from said connected ends downwardly and outwardly inclined, said spreader arms being formed at the outer ends thereof with grooves in which said edges of the trough-shaped container means are normally engaged.

9. A transporting arrangement as defined in claim 5 and including a loading station located at a portion of said path for loading said container means with material and comprising means located beneath said bottom portion of said container means for engaging and raising said bottom portion to such and extent to cause said edges to move away from each other to the region of the lower outer ends of said spreader arms to facilitate loading of said container means.

10. A transporting arrangement as defined in claim 9, wherein said loading station includes a substantially trough-shaped bed adapted to receive said trough-shaped container means, and wherein said engaging and raising means are formed by bottom wall portions of said trough-shaped bed movable between an inactive position downwardly spaced from the bottom portion of the container means and a raised position engaging said bottom portion and raising it to said extent.

11. A transporting arrangement as defined in claim 10, wherein said bottom wall portion of said bed includes a pair of plates hingedly connected at outer edges thereof to the remainder of said bed and fluid operated jack means hingedly connected to said plates for moving the same between said active and said inactive positions thereof.

12. A transporting arrngement as defined in claim 10, wherein said movable bottom wall portions of said bed comprise inflatable means located at the bottom of the trough-shaped bed.

13. A transporting arrangement as defined in claim 1, and including a loading station located at a portion of said path for loading said container means with material, said loading station including an intermediate bunker adapted to discharge material into said container means, said bunker having a loading capacity equal to that of said container means.

14. A transporting arrangement as defined in claim 3 and including a loading station located at a portion of said path for loading said container means with material, said loading station including discharge means for continuously discharging material into said container means as the latter is moved by said locomotive means past said discharge means, sensing means for sensing the extent to which successive portions of said container means are filled by said discharge means, and means cooperating with said sensing means for regulating the speed of said locomotive means, while the latter moves the container means past the discharge means, in dependence on the amount of material fed into successive portions of said container means.

15. A transporting arrangement as defined in claim 14, wherein said regulating means include a wireless sender on said sensing means and wireless receiver on said locomotive means.

16. A transporting arrangement as defined in claim 1, wherein said discharge means comprises lifting roller means arranged at a portion of said path to engage said bottom portion of said container means and to raise said bottom portion to said raised position.

17. A transporting arrangement as defined in claim 16, wherein said discharge means comprises stationary support means turnably supporting said lifting roller means so that successive bottom portions are raised as said container means moves along said path over said discharge means.

18. A transporting arrangement as defined in claim 16, wherein said lifting roller means are mounted on said support means movable between an inactive position downwardly spaced from said bottom portion and an active raised position engaging and raising said bottom portion to said raised position.

19. A transporting arrangement as defined in claim 16, wherein said discharge means comprises support means turnably supporting said lifting roller means, said support means being movable along a portion of said path so as to raise, while said container means is at standstill, successive bottom portions of said container means.

20. A transporting arrangement as defined in claim 1, wherein said stationary guide means comprises elevated rail means, and wherein said carrier means comprises a plurality of connected trolleys arranged spaced from each other and movable along said rail means.

References Cited

UNITED STATES PATENTS

| 2,928,525 | 3/1960 | Schaeffer | 198—184 XR |
| 3,324,806 | 6/1967 | Olsen | 105—150 |

ROBERT G. SHERIDAN, Primary Examiner.

U.S. Cl. X.R.

214—44, 59; 198—184; 104—88; 105—149, 150, 242